US008718915B1

(12) United States Patent
Turcios et al.

(10) Patent No.: US 8,718,915 B1
(45) Date of Patent: May 6, 2014

(54) SYSTEM, MODULE, AND METHOD FOR GENERATING AN IMAGE OF A FLIGHT ROUTE CORRIDOR ON A DISPLAY UNIT

(75) Inventors: Felix B. Turcios, Cedar Rapids, IA (US); Patrick D. McCusker, Walker, IA (US); Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1237 days.

(21) Appl. No.: 12/283,400

(22) Filed: Sep. 8, 2008

(51) Int. Cl.
*G01C 21/00* (2006.01)
*G05D 1/10* (2006.01)
*G06F 7/00* (2006.01)
*G06F 17/00* (2006.01)
*G06T 15/10* (2011.01)

(52) U.S. Cl.
USPC ............... 701/209; 701/3; 701/301; 342/176; 342/180

(58) Field of Classification Search
USPC ............ 701/209, 10, 16, 201, 202, 206, 208, 701/301; 340/931, 945, 961, 970; 342/109, 342/180; 345/419, 618
See application file for complete search history.

(56) References Cited

U.S. PATENT DOCUMENTS

| 6,421,603 | B1* | 7/2002 | Pratt et al. ..................... 701/528 |
| 6,577,947 | B1* | 6/2003 | Kronfeld et al. .............. 701/528 |
| 7,375,678 | B2* | 5/2008 | Feyereisen et al. ........... 342/180 |
| 2003/0222887 | A1* | 12/2003 | Wilkins et al. ................ 345/618 |
| 2008/0154447 | A1* | 6/2008 | Spinelli ............................ 701/7 |

* cited by examiner

*Primary Examiner* — Joy Chng
(74) *Attorney, Agent, or Firm* — Donna P. Suchy; Daniel M. Barbieri

(57) ABSTRACT

A present novel and non-trivial system, module, and method for generating an image of a flight route corridor displayed an aircraft display unit. A processor generates an image data set using navigation data and object data, where object data includes terrain and obstacle data. The image data set is determined using the object data and flight route corridor data, wherein the flight route corridor data is determined by applying navigation and object data to flight route corridor design criteria. The image data set is provided to a display unit to display a flight route corridor and at least one "offending" object against the background of the scene outside the aircraft, where offending objects include those objects penetrating an obstacle clearance surface and those objects penetrating the flight route corridor. The depiction of the flight route corridor and offending objects may be enhanced with the use of highlighters.

19 Claims, 11 Drawing Sheets

| Nominal Localizer Deviations | | | | |
|---|---|---|---|---|
| Deviation / Location | 0.5 Dot (0.625°) | 1 Dot (1.25°) | 1.5 Dot (1.875°) | 2 Dot (2.5°) |
| Threshold | 87.50 ft | 175.00 ft | 262.50 ft | 350.00 ft |
| 7 NM | 551.75 ft | 1103.50 ft | 1655.25 ft | 2207.00 ft |

| Nominal Glide Slope Deviations | | | | |
|---|---|---|---|---|
| Deviation / Location | 0.5 Dot (0.175°) | 1 Dot (0.35°) | 1.5 Dot (0.525°) | 2 Dot (0.7°) |
| Threshold | 3.06 ft | 6.11 ft | 9.17 ft | 12.22 ft |
| 7 NM | 132.97 ft | 265.94 ft | 398.91 ft | 531.88 ft |

FIG. 3

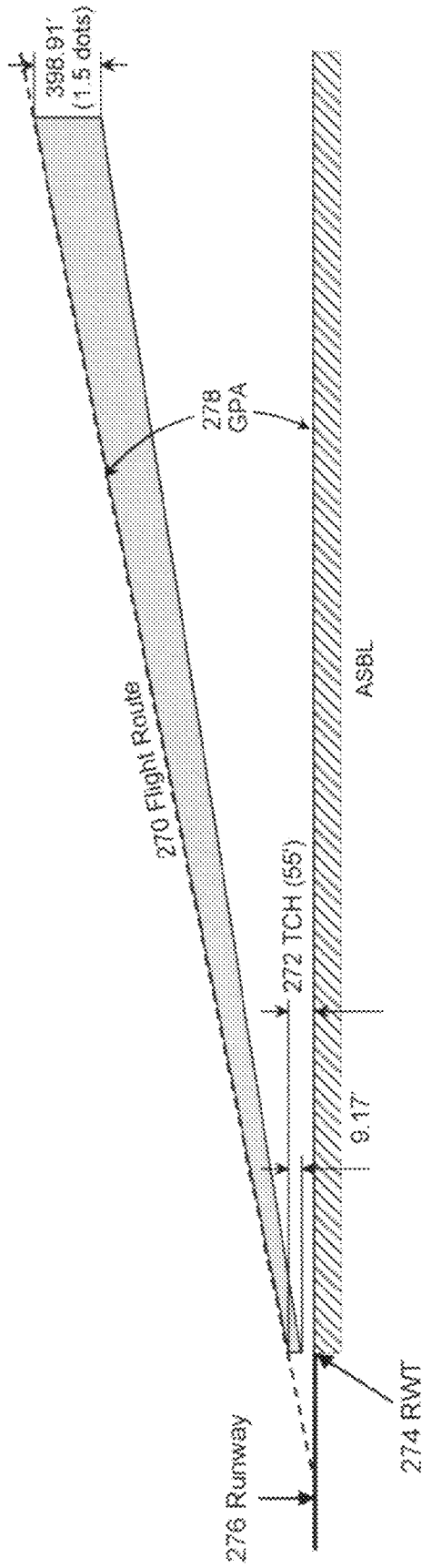
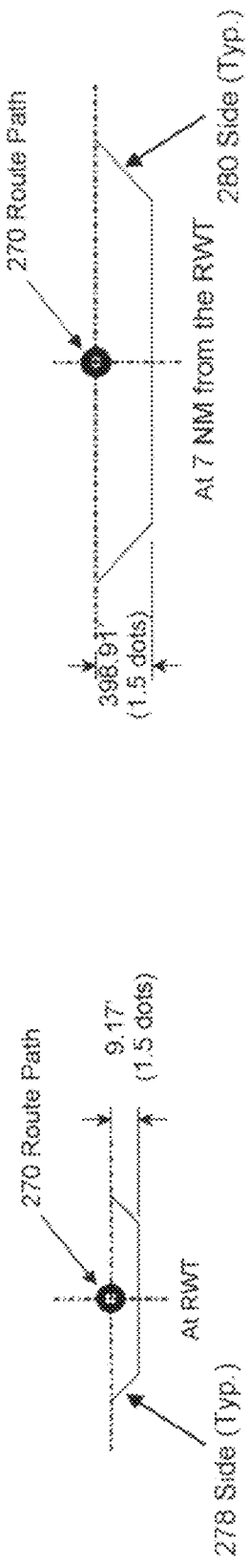
FIG. 6A
FIG. 6B
FIG. 6C

Profile View

Plan View

SYSTEM, MODULE, AND METHOD FOR GENERATING AN IMAGE OF A FLIGHT ROUTE CORRIDOR ON A DISPLAY UNIT

BACKGROUND OF THE INVENTION

1. Field of the Invention

This invention pertains generally to the field of cockpit indicators or display units that provide flight information to the pilot or flight crew of an aircraft, and more particularly to synthetic vision systems (SVS), enhanced vision systems (EVS), or a combined vision system.

2. Description of the Related Art

Advancements in display technology have provided the ability to depict objects in a three-dimensional synthetic or enhanced scene representative of the scene outside of the aircraft. Although low visibility flight conditions prevent the pilot from visually seeing an object outside of the aircraft, a pilot may see the image or symbol of the object and/or its location in a synthetic or enhanced scene. A pilot who "sees" an object is able to navigate around it.

An aviation regulatory authority or organization possesses the authority of designing and designating instrument approach and departure procedures. In the United States, the Federal Aviation Administration ("FAA") establishes and provides definitions and ascertainable dimensions of instrument approach and departure procedures. For instance, FAA Order 8260.3B entitled "United States Standard for Terminal Instrument Procedures (TERPS)" dated May 15, 2002 provides criteria used to formulate, review, approve, and publish procedures for instrument approach and departure of aircraft to and from civil and military airports. Also, FAA Order 8260.54A entitled "The United States Standard for Area Navigation (RNAV)" provides criteria for obstacle clearance evaluation of RNAV approach procedures, e.g., Localizer Performance with Vertical Navigation ("LPV"), Lateral Navigation ("LNAV"), Lateral Navigation/Vertical Navigation ("LNAV/VNAV"), and Localizer Performance ("LP"). The criteria in FAA Order 8260.54A support adding an instrument landing system ("ILS") approach line of minimum to an RNAV (GPS) approach procedure using LPV construction criteria at runways served by an instrument landing system.

In the design of approach and departure procedures, an obstacle clearance surface ("OCS") may be constructed below a presumed glidepath or climb path of an aircraft to assure the pilot that the path is free from objects. To make such assurance, the OCS is examined for object penetration where such object could include terrain and obstacles. If the OCS is penetrated, then adjustments may be made to address the penetration, where such adjustments include raising the OCS until the OCS is free from object penetration. A consequence of this action, however, may be an unfavorable increase in a minimum altitude to which the pilot may descend the aircraft to a runway in low visibility flight conditions in an approach procedure or affect a pilot's decision to take-off and depart from the airport using a departure procedure.

Although approach and departure procedures are designed to assure that an aircraft route or approach course is free from objects in low visibility conditions, alternative assurance through display technology may be provided by presenting the pilot with an image or symbol of the object and/or its location within a synthetic or enhanced scene of a flight route corridor. Objects within or below a flight route corridor not visible to the pilot that would otherwise penetrate an OCS may now be identified by the pilot and avoided, thereby providing an alternative means for assuring object separation.

BRIEF SUMMARY OF THE INVENTION

The embodiments disclosed herein present at least one novel and non-trivial system, module, and method for generating an image of a flight route corridor on a display unit. The display of a flight route corridor on a display unit includes the display of objects such as terrain and obstacles that penetrate an obstacle clearance surface or objects that would not meet a minimum obstacle clearance distance.

In one embodiment, a system is disclosed for generating an image of a flight route corridor on a display unit. The system comprises a source of navigation data, a source of object data where an object may be terrain and/or obstacles, a processor, and a display unit. The processor could generate an image data set representative of a scene outside the aircraft based upon object data and flight route corridor data, and the flight route corridor data may be determined by navigation data and object data through the programming of flight route corridor design criteria. As embodied herein, the criteria could correspond to a final approach route, a missed approach route, a departure route, an arrival route, and/or a cruise route. After the image data set has been generated, the processor could provide the image data set to a display unit for presenting an image representative of the image data set, whereby a flight route corridor and at least one "offending" object (as described herein) is depicted against the background of the scene outside the aircraft. As embodied herein, the processor may be a processor used in a vision system including, but not limited to, an SVS or EVS. As embodied herein, the display unit could include an HDD unit, a HUD unit, or both.

In another embodiment, a module is disclosed for generating an image of a flight route corridor on a display unit. The module comprises an input communications interface, a processor, and an output communications interface. The input communications interface facilitates the receipt of data. The processor could generate an image data set representative of a scene outside the aircraft based upon object data and flight route corridor data, and the flight route corridor data may be determined by navigation data and object data through the programming of flight route corridor design criteria. As embodied herein, the criteria could correspond to a final approach route, a missed approach route, a departure route, an arrival route, and/or a cruise route. After the image data set has been generated, the image generating processor could provide the image data set to an output communications interface for facilitating the providing of the image data set to a display unit. As embodied herein, the processor may be a processor used in a vision system including, but not limited to, an SVS or EVS.

In another embodiment, a method is disclosed for generating an image of a flight route corridor on a display unit. Navigation data and object data could be received. An image data set could be generated, wherein the image data set may be representative of a scene outside the aircraft based upon object data and flight route corridor data, and the flight route corridor data may be determined by navigation data and object data through the programming of flight route corridor design criteria. As embodied herein, the criteria could correspond to a final approach route, a missed approach route, a departure route, an arrival route, and/or a cruise route. This image data set could be provided to a display unit for presenting an image representative of the image data set, whereby a flight route corridor and at least one "offending" object is depicted against the background of the scene outside the aircraft.

The drawings of FIG. 2 depict reference points that may be stored in a navigation database and used in the design of approach procedures.

FIG. 3 depicts criteria that may be used as a basis for constructing and displaying a flight route corridor.

Figure 4:
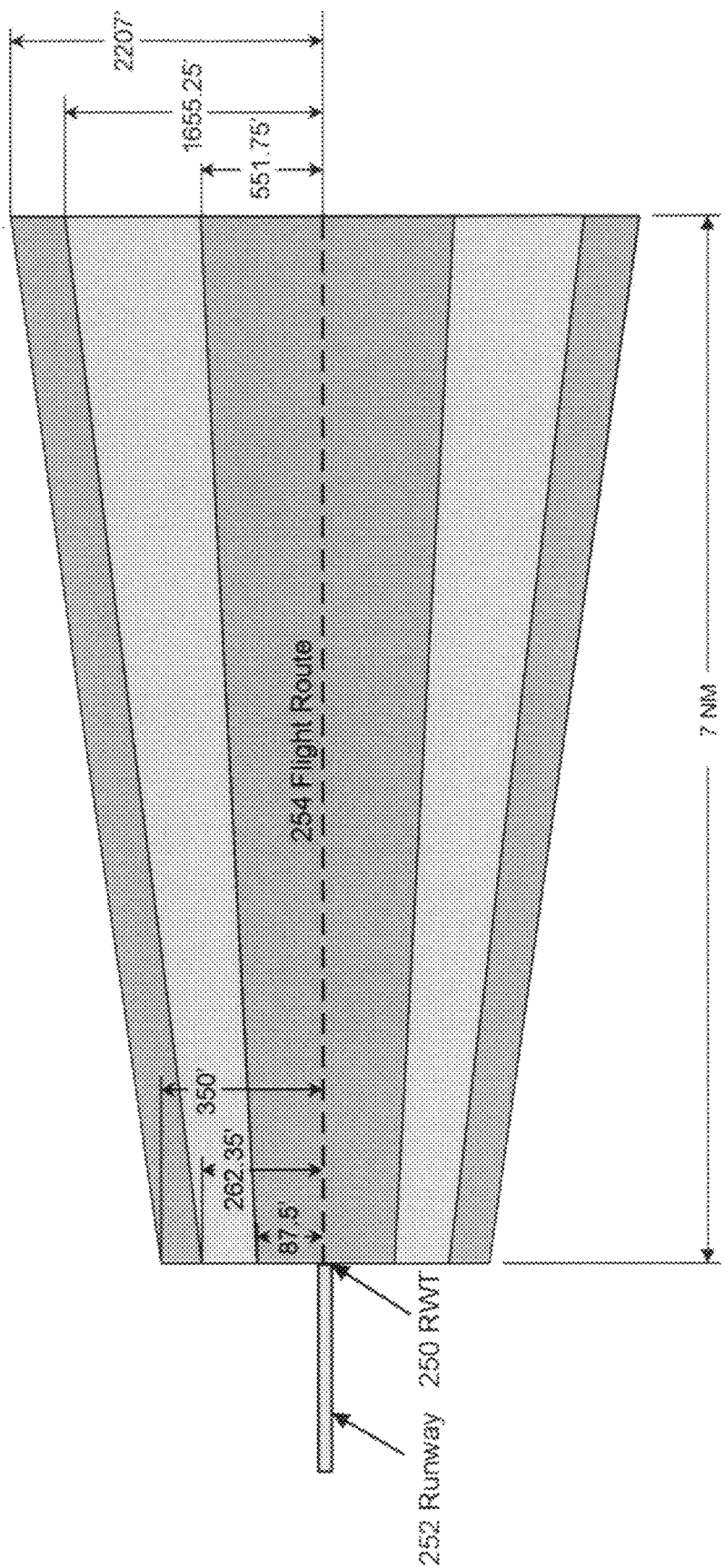

FIG. 4 illustrates a geometric basis for establishing lateral boundaries of a flight route corridor.

Figure 5:
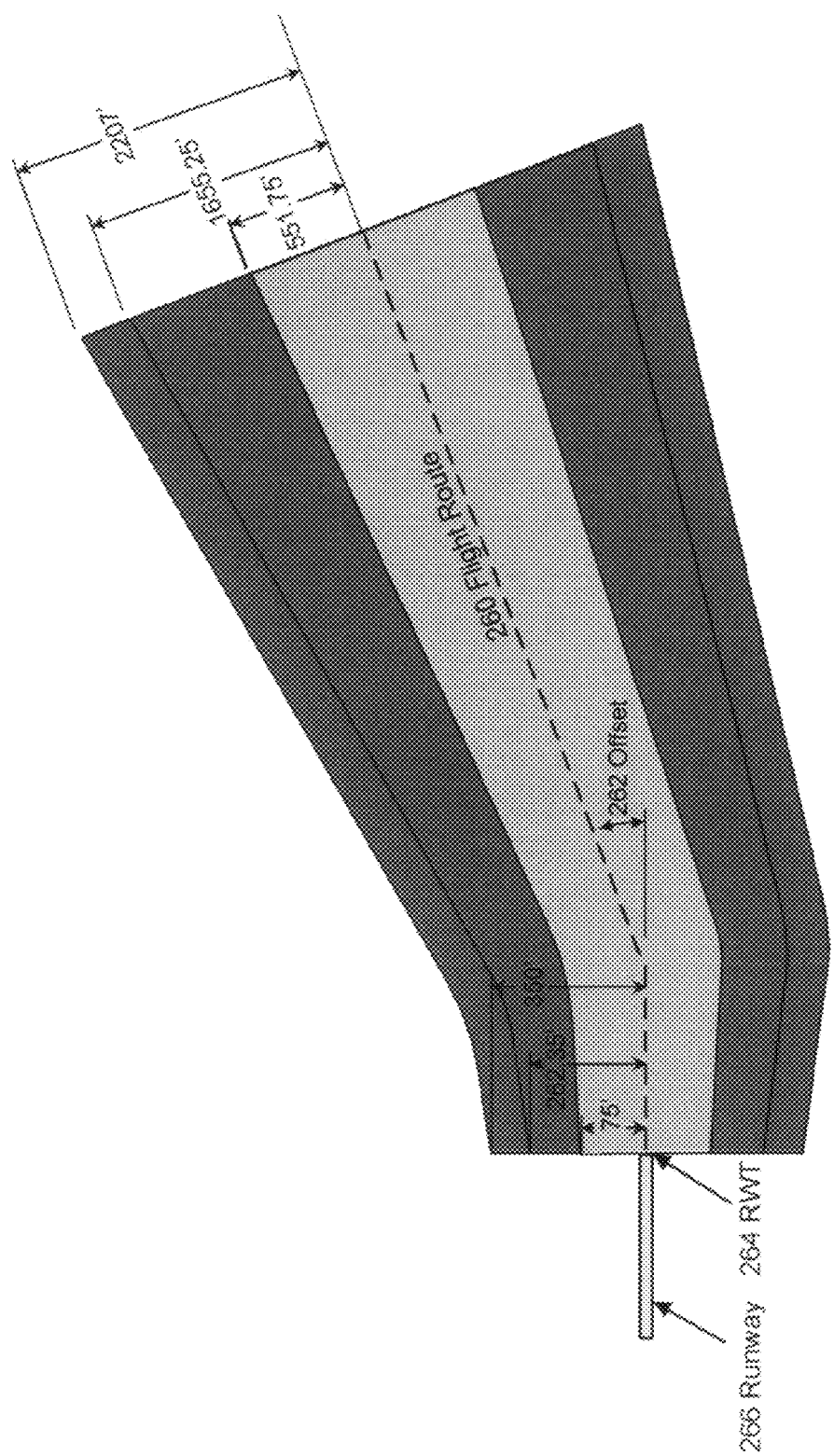

FIG. 5 illustrates a second geometric basis for establishing a flight route corridor.

The drawings of FIG. 6 illustrate a geometric basis for establishing vertical boundaries of a flight route corridor.

The drawings of FIG. 7 depict terrain and obstacles located near a runway.

The drawings of FIG. 8 provide examples depiction of a flight route corridor on a display unit.

Figure 9:
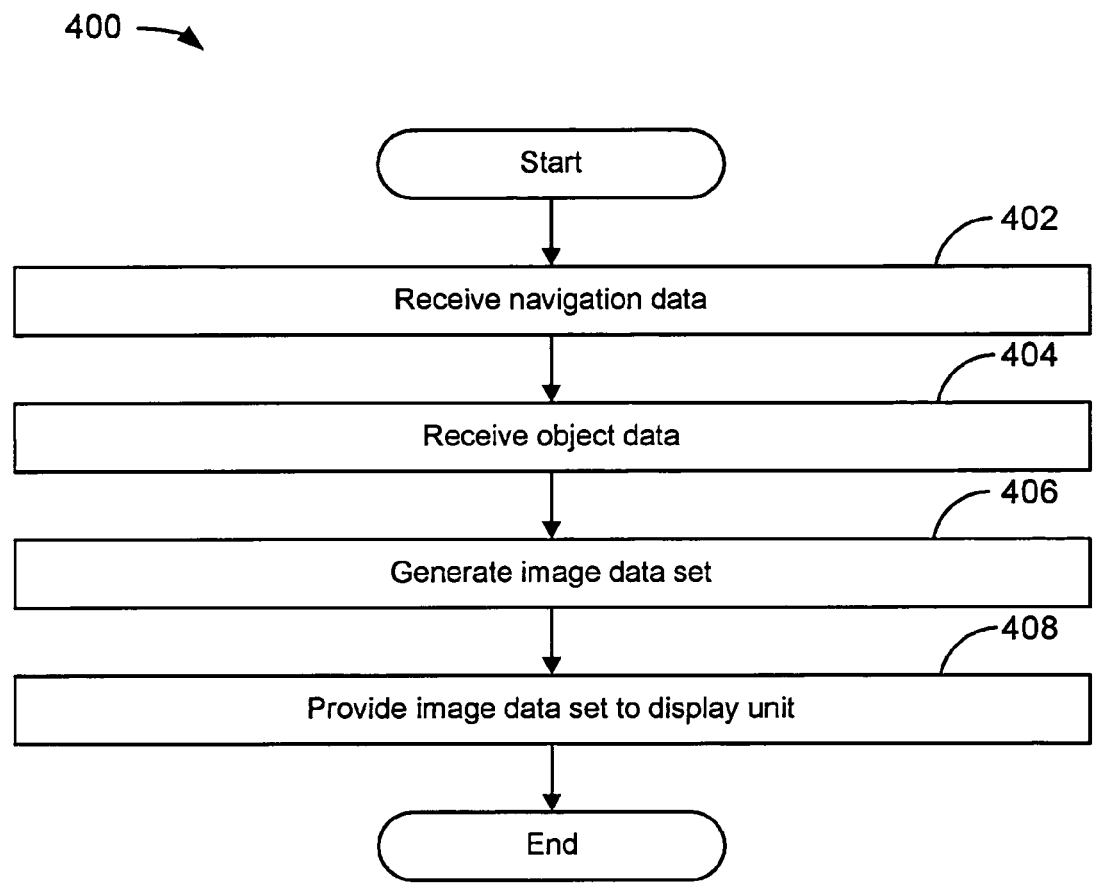

FIG. 9 provides a flowchart illustrating a method for generating a flight route corridor on a display unit.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
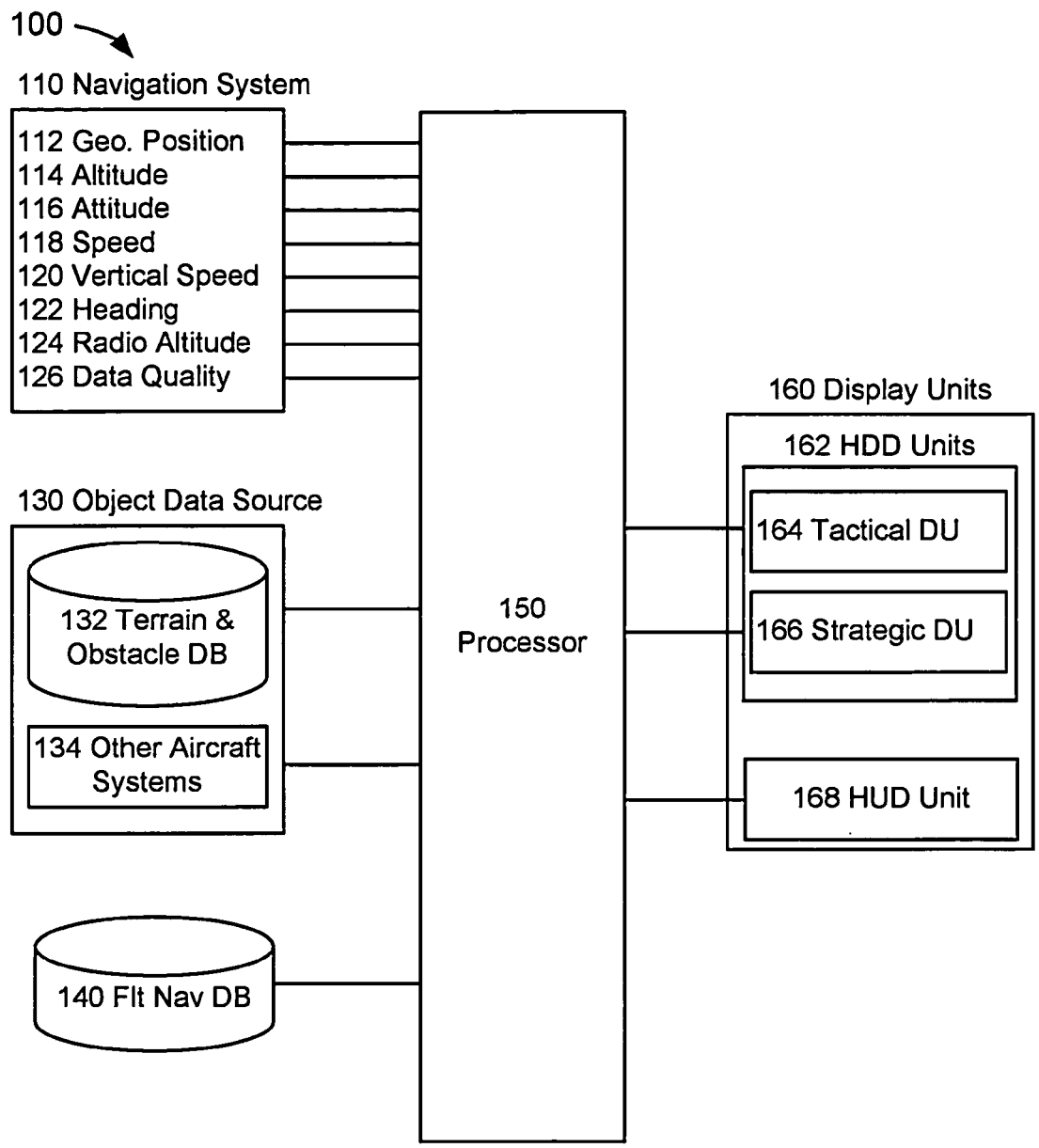
FIG. 1 depicts a block diagram of a flight route corridor display system.

FIG. 1 depicts a block diagram of flight route corridor display system 100 suitable for implementation of the techniques described herein. The aircraft flight route corridor display system 100 of an embodiment of FIG. 1 could include navigation system 110, object data source 130, flight navigation database 140, processor 150, and display units 160.

In an embodiment of FIG. 1, a navigation system 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system ("GNSS") (or satellite navigation system), and a flight management computing system, all of which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could provide navigation data including, but not limited to, geographic position 112, altitude 114, attitude 116, speed 118, vertical speed 120, heading 122, radio altitude 124, and data quality 128 to a processor 150 for subsequent processing as discussed herein.

Navigation data quality 128 may include, but is not limited to, accuracy, uncertainty, integrity, and validity for data provided by a navigation system 110. As embodied herein, aircraft position comprises geographic position (e.g., latitude and longitude coordinates) and altitude, and direction may be derived from either geographic position, aircraft position, or both. As embodied herein, aircraft orientation may include pitch, roll, and/or yaw information related to the attitude of the aircraft.

In an embodiment of FIG. 1, an object data source 130 may include, but is not limited to, a terrain and/or obstacle database 132, other aircraft systems 134, or any combination thereof. As embodied herein, object data may be data representative of terrain and/or obstacles. An object data source 130 could comprise any source of terrain data, obstacle data, other manmade or natural features, geopolitical boundaries, or any combination thereof. Obstacles may include, but are not limited to, towers, buildings, poles, wires, other manmade structures, and foliage.

A terrain database 132 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be defined in arc-seconds of latitude and longitude, or may be rectangular, square, hexagonal, or circular. A grid or cell may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 132 and navigation database 140 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle could be stored in terrain database 131, and a temporary runway closure could be stored in a flight navigation database 137. Any database used in the embodiments disclosed herein may be a stand-alone database or a combination of databases. For example, a terrain database 132 may be associated with a terrain awareness and warning system ("TAWS") only. In an alternative embodiment, terrain data could be stored in or combined with an airport database, airspace database, or with a database used by any other aircraft system including, but not limited to, a flight management computing system, or an airspace awareness and warning system ("AAWS"). An example of a TAWS and an AAWS which utilize airport and airspace databases are described in U.S. patent application Ser. No. 12/069,234 and U.S. Pat. No. 7,714,744, respectively.

Although other aircraft systems 134 could employ terrain databases 132, such systems could also be a source of terrain data provided to a processor 150. For example, a synthetic vision system ("SVS") may employ a terrain database to generate terrain image data. Here, the terrain database that is part of an SVS could be the source of terrain data in system 100. Alternatively, the SVS could provide a processor 150 with terrain data in the form of terrain image data. In another alternative, an Enhanced Vision System ("EVS") could provide terrain data in the form of terrain image data. In another alternative, a combined SVS and EVS could provide terrain data in the form of terrain image data. Other examples of other aircraft systems 134 which could comprise sources of terrain data include, but are not limited to, a database-based TAWS, a radar-based TAWS, and an AAWS. As embodied herein, a terrain database 132 and other aircraft systems 134 could provide terrain data to a processor 150 for subsequent processing as discussed herein.

A navigation database 140 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, GNSS Landing Systems. Data contained in a navigation database 140 could be used in the construction of instrument approach and departure procedures as disclosed herein. Such data or records could include that associated with heliports.

The drawings of FIG. 2 depict some of the reference points and definitions associated with a runway 202 that may be stored in a navigation database 140 and used in the design of approach procedures. Data representative of these points and definitions for one or more runways could be contained in a navigation database 140. A runway Landing Threshold Point ("LTP") 204 (which could also be called a runway threshold point) may be a three dimensional point at an intersection of the runway centerline 206 and the runway threshold ("RWT") 208; the direction of a runway centerline 206 from an LTP 204 may be a measured in reference to magnetic north using a magnetic bearing. In one embodiment, a LTP 204 could be defined using latitude, longitude, and elevation derived from government sources. In another embodiment, a geoid height could be included in definition, where a geoid could be considered to be an equipotential surface that is everywhere normal to the direction of gravity and would coincide with the mean ocean surface of the Earth, if the oceans were in equilibrium, at rest, and extended through the continents. The surface of a geoid may be approximated using a mathematically-defined reference ellipsoid employed in a geodetic system. The height of a geoid ("GH") may be measure relative to the ellipsoid, and it may be positive if it is above the reference ellipsoid and negative if it is below.

Geodetics or geodesy is a scientific discipline dealing with the measurement and representation of the Earth. An example of a geodetic system, provided for the purpose of illustration and not limitation, is a World Geodetic System ("WGS"). A WGS could be used, for example, in a GNSS to provide a frame of reference or coordinate system of the Earth. WGSs have evolved with past refinements made possible due to additional global data from precise and accurate measurements and will likely further evolve with future refinements. Those skilled in the art can appreciate the adaptability of future refinements of the WGS or any other geodetic system to the embodiments disclosed.

A glidepath angle ("GPA") 210 may be the angle of a specified final approach descent path 212 (or glidepath) to be flown by an aircraft 214 relative to an Approach Surface Base Line ("ASBL") 216 at the RWT 208, where the ASBL 216 may be considered as a horizontal line tangent to the Earth. A Threshold Crossing Height ("TCH") 218 may be the height of the GPA 210 above the LTP 204. A Flight Path Control Point ("FPCP") 220 may be an imaginary point above the LTP 204 at the TCH 218 from which the glidepath mathematically emanates.

Figure 2A:
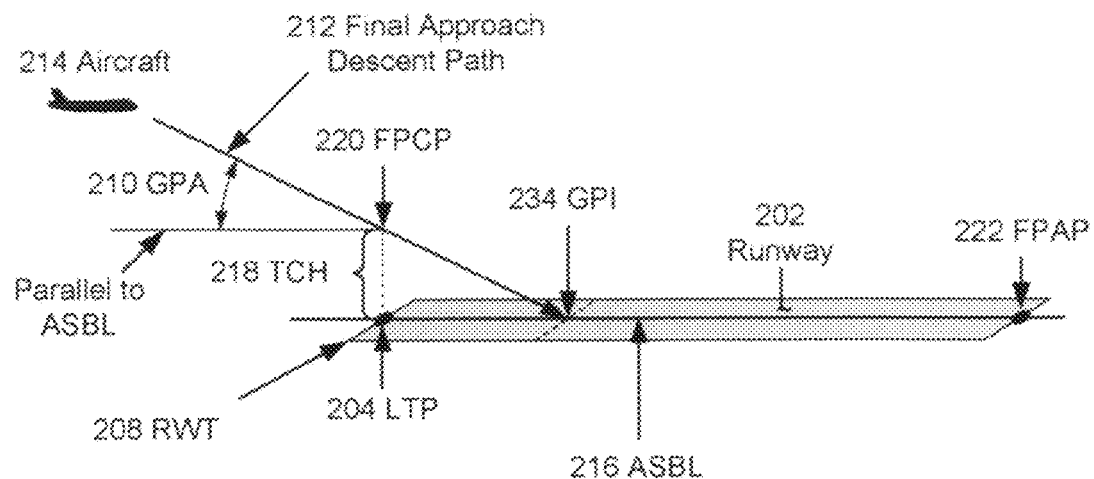
Figure 2B:
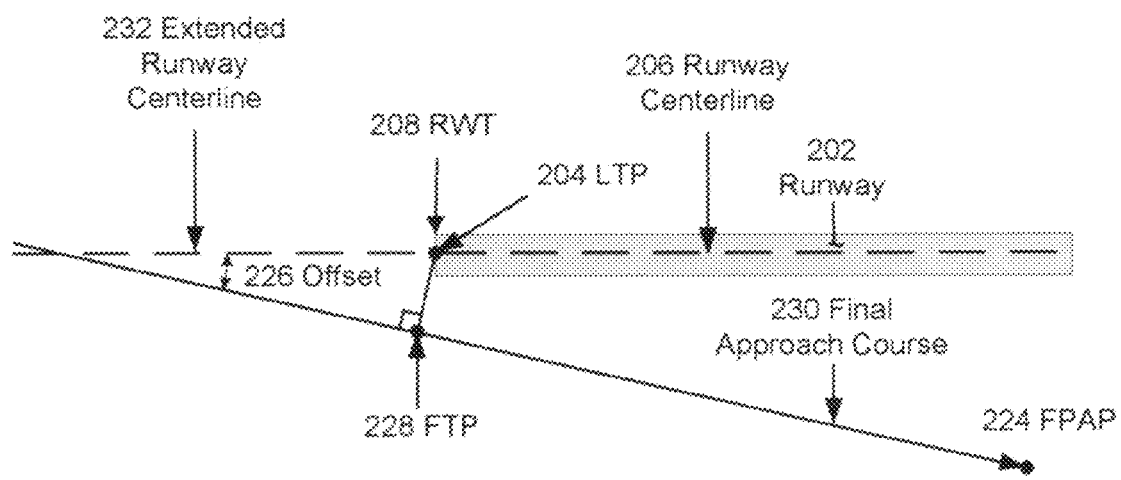

A Flight Path Alignment Point ("FPAP") 222 or 224 may be a three-dimensional point used in conjunction with a LTP 204 and the geometric center of a WGS reference ellipsoid to define a vertical plane containing a final approach course of a final approach descent path 212. As shown in FIG. 2A, a FPAP 222 could be located at the departure end of the runway 202 that is opposite of the RWT 208, or it could be located at a different location. As shown in FIG. 2B, a FPAP 224 and a final approach course 212 may be offset from a runway centerline 206, and where such offset exists, a Fictitious Threshold Point ("FTP") 228 could be used as an equivalent of a LTP 204, where the FTP 228 may be located at an intersection of a final approach course 212 and a line perpendicular to it passing through the LTP 204; the elevation of a FTP 228 could be the same as a LTP 204. The angle of offset 226 may be the angle formed between a final approach course 230 and an extended runway centerline 232 having the same direction or magnetic bearing as runway centerline 206. A Ground Point of Intercept ("GPI") 234 may be a point in the vertical plane where the final approach descent path 212 intercepts the ASBL 216.

A processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a processor 150 could be a processor(s) used by or in conjunction with any other system of the aircraft including, but not limited to, a processor(s) associated with a navigation system, a flight management computing system, a terrain awareness and warning system ("TAWS"), a vision system, or any combination thereof.

A processor 150 may receive input data from various systems and/or sources including, but not limited to, navigation system 110, object data source 130, and a flight navigation database 140. A processor 150 may be electronically coupled to systems and/or sources to facilitate the receipt of input data; as embodied herein, operatively coupled may be considered as interchangeable with electronically coupled. A processor 150 may provide output data to various systems and/or units including, but not limited to, display units 160. A processor 150 may be electronically coupled to systems and/or units to facilitate the providing of output data. It is not necessary that a direct connection be made; instead, such receipt of input data and the providing of output data could be provided through a data bus or through a wireless network.

Display units 160 may include, but are not limited to, HDD units 162 units and HUD 168 units. Display units 160 may display image from data produced by one or more vision systems such as, but not limited to, an SVS, an EVS, or a combined SVS-EVS. HDD units 162 are typically units mounted to an aircraft's flight instrument panel located in front of a pilot and below the windshield and the pilot's field of vision. As embodied herein, tactical flight information displayed on a tactical display unit 164 could be information relevant to the instant or immediate control of the aircraft, whether the aircraft is in flight or on the ground. A tactical display unit 164 could display the same information found on a primary flight display ("PFD"), such as "basic T" information (i.e., airspeed, attitude, altitude, and heading). Although it may provide the same information as that of a PFD, tactical display unit 164 may also display a plurality of indications or information including, but not limited to, flight route, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 164 is designed to provide flexible configurations which may be tailored to the desired configuration specified by a buyer or user of the aircraft.

A strategic display unit 166 could be a unit which presents information to the crew relative to the intended future state(s) of the aircraft (e.g. intended location in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, terrain information may be displayed simultaneously with information of other systems. In one embodiment herein, terrain information may be displayed simultaneously with weather information with no loss or a negligible loss of displayed information.

Generally, an aviation regulatory authority or organization possesses the authority of designing and designating instrument approach and departure procedures. In the United States, the Federal Aviation Administration ("FAA") establishes and provides definitions and ascertainable dimensions of instrument approach and departure procedures. For instance, FAA Order 8260.3B entitled "United States Standard for Terminal Instrument Procedures (TERPS)" dated May 15, 2002 provides criteria used to formulate, review, approve, and publish procedures for instrument approach and departure of aircraft to and from civil and military airports. Also, FAA Order 8260.54A entitled "The United States Standard for Area Navigation (RNAV)" provides criteria for obstacle clearance evaluation of RNAV approach procedures, e.g., Localizer Performance with Vertical Navigation ("LPV"), Lateral Navigation ("LNAV"), Lateral Navigation/Vertical Navigation ("LNAV/VNAV"), and Localizer Performance ("LP"). The criteria in FAA Order 8260.54A support adding an instrument landing system ("ILS") approach line of minimum to an RNAV (GPS) approach procedure using LPV construction criteria at runways served by an instrument landing system. At the time of this writing, both Orders may be obtained on the Internet.

Some or all of the reference points and definitions stored in a navigation database 140 could be used as construction criteria in the design of approach and departure procedures including criteria specified for obstacle clearance evaluation of ground-based approach procedures including, but not limited to, an ILS and RNAV approach procedures including, but not limited to, LPV, LNAV/VNAV, LP, and LNAV. Typically, LPV and LNAV/VNAV approach procedures provide vertically guided procedures, and LP and LNAV approach procedures provide non-vertically guided procedures.

It should be noted that the following disclosure will discuss in detail the construction of an approach procedure and provide examples demonstrating the application of procedure design criteria to construct an ILS approach path. Although the discussion will be drawn to the application of approach construction criteria to an ILS approach procedure, the embodiments herein are not limited to such procedure. The embodiments herein include any other approach or departure procedure, or any other procedure or flight phase, associated with a flight path from which an obstacle clearance surface may be constructed and examined for object penetration.

The discussion herein may be drawn to FAA standards for the purpose of simplifying the illustration and discussion only; however, the embodiments are neither limited nor restricted to the design and designation criteria of instrument approach and departure procedures employed in the United States or those with governing oversight of the FAA. It is known to those skilled in the art that aviation governing authorities throughout the world may develop or may have developed criteria unique to their respective jurisdictions which may or may not employ similar approach and departure procedure criteria, and end-users of navigational data could develop criteria directed to unique operational requirements that may or may not require special equipment or authorization. The embodiments disclosed herein could include any approach or departure procedure developed from at least one ascertainable fix and/or obstacle clearance evaluation criteria.

To understand the advantages and benefits of the embodiments disclosed herein, the discussion will be drawn to characteristics of an ILS system. An ILS includes two components: a localizer for providing lateral guidance to an approach to a runway and a glide slope for providing vertical guidance simultaneously. A localizer could provide a lateral course having a width of 5° centered laterally on an approach path; a glide slope could provide a vertical course having a course thickness of 1.4° centered vertically on an approach path. A cockpit display unit may display lateral and vertical deviations from the approach path as dots and not degrees, where 4 dots could indicate the full width of the localizer and glide slope deviation. For the localizer each dot would represent 1.25° of lateral deviation, and for the glide slope each dot represents 0.35° of vertical deviation.

FIG. 3 depict criteria that could be associated with an ILS approach procedure that may be used as a basis for constructing and displaying a flight route corridor as disclosed herein, where such corridor may be used in conjunction with, but not limited to, a final approach path, a missed approach path and a departure path. As shown in FIG. 3, the amount of deviation is variable. Because the lateral and vertical boundaries typically comprise of straight lines, the amount of variation is linearly proportional and may be determined from any fixed reference point which, as indicated in FIG. 3, could be a runway threshold. For the purpose of illustration, it is assumed that the full width of localizer deviation (i.e., 5° or 4 dots) at the runway threshold is 700 feet and the full thickness of the vertical deviation (i.e., 1.4° or 4 dots) at the runway threshold is 24.44 feet. As shown in FIG. 3, the full width of localizer deviation on each side of the approach path (i.e., 2.5° or 2 dots) at the runway threshold is 350 feet, and the full thickness of the vertical deviation on each side of the approach path (i.e., 0.7° or 2 dots) at the runway threshold is 12.22 feet. Likewise, the full width of localizer deviation on each side of the approach path (i.e., 2.5° or 2 dots) at a position 7 NM from the runway threshold is 2,207 feet, and the full thickness of the vertical deviation on each side of the approach path (i.e., 0.7° or 2 dots) at a position 7 NM from the runway threshold is 531.88 feet. Although the distance 7 NM is being used in this discussion, the length of the corridor may be determined using a distance between a RWT and an existing waypoint such as a (precision) final approach fix or final approach course fix.

The advantages and benefits of the embodiments discussed herein may be illustrated by showing examples of how criteria such as discussed in FIG. 3 may be used in a flight route corridor display system 100. FIG. 4 is an illustration of the lateral geometry of a localizer course that may serve as the geometric basis for establishing a flight route corridor; FIG. 4 is not drawn to scale. The dimensions provided in FIG. 3 have been applied to construct a flight route corridor. As shown in FIG. 4, the lateral boundaries at the RWT 250 of runway 252 at 0.5, 1.5, and 2.0 dots are respectively measured to be 87.50', 262.50', and 350' from a flight route 252. It should be noted that a boundary at 1.0 dot has been intentionally omitted. The lateral boundaries at a position 7.0 NM from the RWT 252 at 0.5, 1.5, and 2.0 dots are respectively measured to be 551.75', 1655.25', and 2,207'.

The dimensions provided in FIG. 3 could also apply to a flight route 260 that is offset 262 from an extended runway centerline. FIG. 5 is an illustration of the lateral geometry of a localizer course that may serve as the geometric basis for establishing a flight route corridor where there is an offset 258; FIG. 5 is not drawn to scale. As shown in FIG. 5, the lateral boundaries at the RWT 264 of runway 266 are the same as in FIGS. 3 and 4, and the lateral boundaries at a point 7.0 NM along the flight route 260 are the same.

The drawings of FIG. 6 are illustrations of the vertical geometry of a localizer course that may serve as the geometric basis for establishing a flight route corridor along a flight path 270; the drawings of FIG. 6 are not drawn to scale. The dimensions provided in FIG. 3 have been applied to construct a flight route corridor, where the TCH 272 is assumed to be 55'. As seen in FIG. 6A, the boundary at the RWT 274 of runway 276 at negative 1.5 dots is measured to be 9.16' below the GPA 278, and the boundary at a position 7.0 NM from the RWT 272 at 1.5 dots is measured to be 398.91' below the GPA. A negative measurement may be selected to provide an allowance for the pilot should he or she descend below the glide path of the flight route.

A flight route corridor could have sides 278 and 280 at its lateral boundaries. As shown in FIGS. 6B and 6C, sides 278 and 280 are shown level to the flight route 270, i.e., respective vertical heights of 9.17' at the RWT and 398.91' at a position 7 NM from the RWT. The sides could slant upwardly as the corridor extends laterally outward. As embodied herein, a manufacturer or end-user has the ability to select one of many side configurations. For example, a slant could be fixed (e.g., 45° as shown) or variable. Alternatively, the slant could begin at a lateral dot; for example, it could begin where the deviation of the lateral course is measured as 1.5 dots, thereby providing a run to rise of 551.75 to 398.91 (2,207'−1655.25'=551.75'); alternatively, the sides could be vertical.

As shown in FIGS. 3 through 7, a flight route corridor may be constructed as a function of ILS final approach criteria. It should be noted, however, that a flight route corridor display system 100 could be used for all phases of flight and not limited to a final approach phase. Any criteria that may be used to formulate, review, approve, and/or publish procedures for instrument approach and departure of aircraft to and from civil and military airports such as, but not limited to the TERPS, may be used as a basis for constructing a flight route corridor. For example, the lateral boundaries of a flight route corridor on a departure route could be established using established lateral boundaries including, but not limited to, published departure procedures ("DP") (e.g., standard instrument departures ("SIDs")) or missed approach criteria for any runway.

Additionally, any criteria that could be used to create one or more approach or departure procedures or generate data representative of one or more approach or departure procedures may be used as a basis for constructing a flight route corridor as embodied herein. For example, a system, module, and/or method for generating procedure data is described in U.S. patent application Ser. No. 12/283,399 entitled "System, Module, and Method for Generating Procedure Data Used in an Avionics System," which is incorporated by reference in its entirety. Moreover, the embodiments of generating an aircraft route corridor disclosed herein may be used in conjunction with a system, module, and/or method which constructs an aircraft procedure.

With a departure route known, lateral boundaries of a flight route corridor could be determined by applying such criteria with the boundaries expanding in width as the departure route moves further away from the airport. With the application of such criteria, the width of the flight route corridor at any point along the flight route could be computed. Similarly, vertical boundaries of a flight route corridor could be determined, for example, by applying the same downward (or negative) sloping criteria from a flight route that was applied above where the flight route corridor expands in thickness as the departure route moves further away from the airport. With the application of such criteria, the thickness of the flight route corridor at any point along the route could be computed. It should be noted that the criteria could provide for a cessation in the expansion of lateral and vertical boundaries at which point the width and thickness of the flight route corridor may become constant. As embodied herein, flight route corridor design criteria include not only final approach routes, missed approach routes, and departure routes but also arrival routes (e.g., STAR routes), and cruise routes.

Figure 7A:
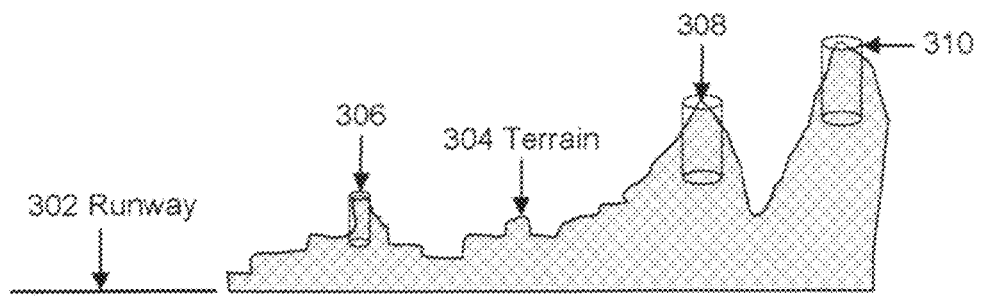
Figure 7B:
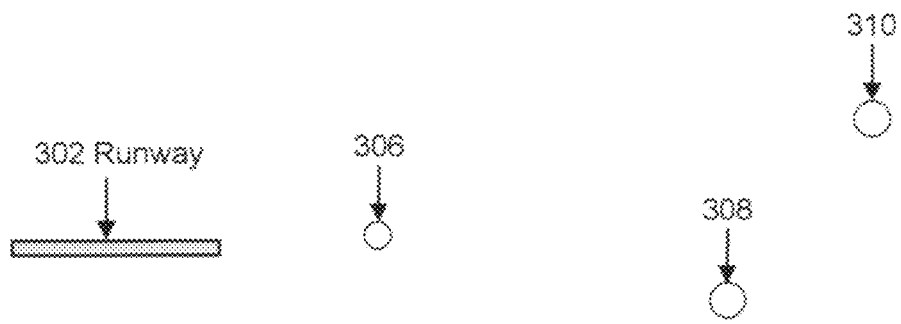

The drawings of FIG. 7 depict terrain and obstacles located near a runway 302. FIG. 7A depicts a profile of the highest terrain 304 within the width of a flight route corridor on which there are three obstacles 306, 308, and 310 which, for the sake of simplicity, are shown depicted as cylinders; the drawings of FIG. 7 are not drawn to scale. Terrain 304 could comprise a surface representative of the elevation corresponding to the Earth's surface that could be provided by an object data source 130. Obstacles 306, 308, and 310 could comprise points on the terrain on which there are obstacles or terrain peaks that could be provided by an object data source 130. FIG. 7B depicts a plan view of the locations of the obstacles 306, 308, and 310.

Figure 7C:
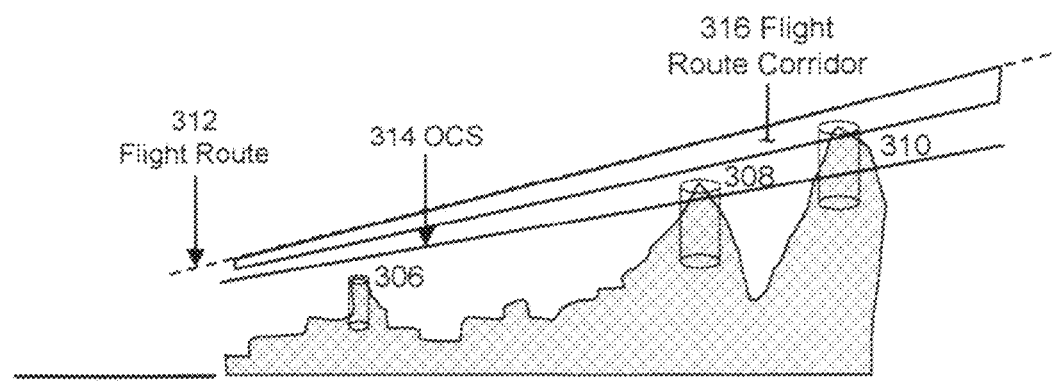

FIG. 7C depicts a flight route 312, obstacle clearance surface 314, and flight route corridor 316 in relation to each other and the profile and obstacles of FIG. 7A. The examples of FIG. 7C are provided to illustrate why each of them may be presented with the flight route corridor as offending objects. In one example, the elevation of obstacle 306 is below the elevation of an OCS 314; however, a minimum obstacle clearance distance (i.e., the distance between flight route 312 and obstacle 306) may nevertheless not be met. In another example, the elevation of obstacle 308 is above the OCS 314 but below the flight route corridor 316. In another example, the elevation of obstacle 310 is above the flight route corridor 316. As embodied herein, offending objects may include both obstacles and/or terrain.

Figure 8A:
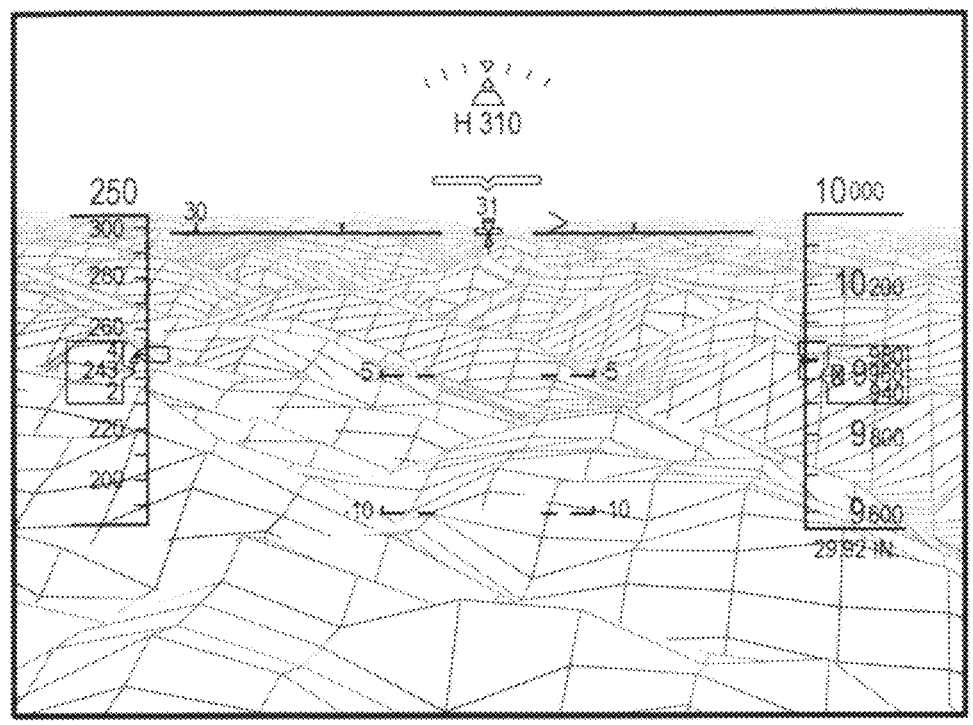

The advantages and benefits of the embodiments discussed herein may be illustrated by showing examples of how a flight route corridor may be displayed on a display unit and how terrain and obstacle locations may be displayed in relation to the flight route corridor. FIG. 8A provides an example of a depiction of an HDD unit presenting symbology of tactical flight information to the pilot or flight crew against the backdrop of a sky/terrain synthetic scene without the presentation of a flight route corridor of the embodiments herein. It should be noted that, although terrain is depicted in a wireframe configuration, it is a representative depiction of a three-dimensional scene outside of the aircraft and includes any configuration which may depict three-dimensional terrain. As embodied herein, tactical display unit 164 may be representative of a HUD unit 168 for the display of a flight route corridor. It should be noted that the symbology depicted on the tactical display unit 164 shown in FIGS. 8A and 8C have been made minimal intentionally for the sake of presentation and is not indicative of the plurality of indications or information with which it may be configured. Because the indications or information shown in FIG. 8A are well-known to those skilled in the art, a discussion of the specific tactical information shown in FIG. 8A is not provided herein.

Figure 8B:
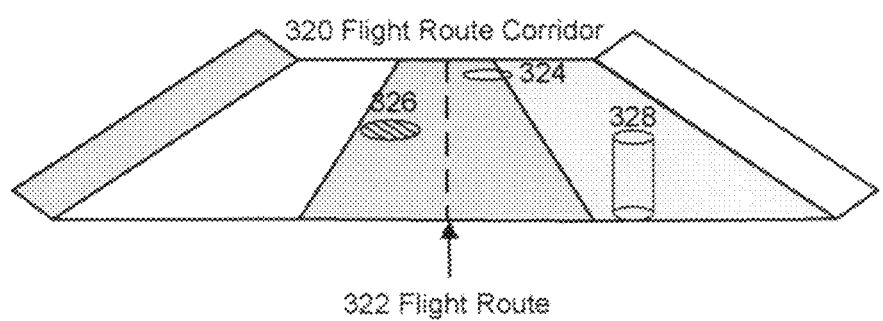

FIG. 8B provides an exemplary illustration of a flight route corridor 320 of flight route 322 and offending objects 324, 326, and 328 (obstacles 306, 308, and 310 of FIG. 7). The drawings of FIG. 8 accurately reflect the relative ease with which a pilot may identify objects of concern that fall within the lateral boundaries of a flight route corridor. Offending object 324 could be depicted because a minimum obstacle clearance between the flight route elevation and obstacle elevation has been exceeded. Offending object 326 could be depicted because it has penetrated an OCS but its elevation is less than the flight route; in this illustration, offending object 326 does not penetrate the flight route corridor. Offending object 328 could be depicted because it has penetrated the flight route corridor, or it falls within the corridor.

Figure 8C:
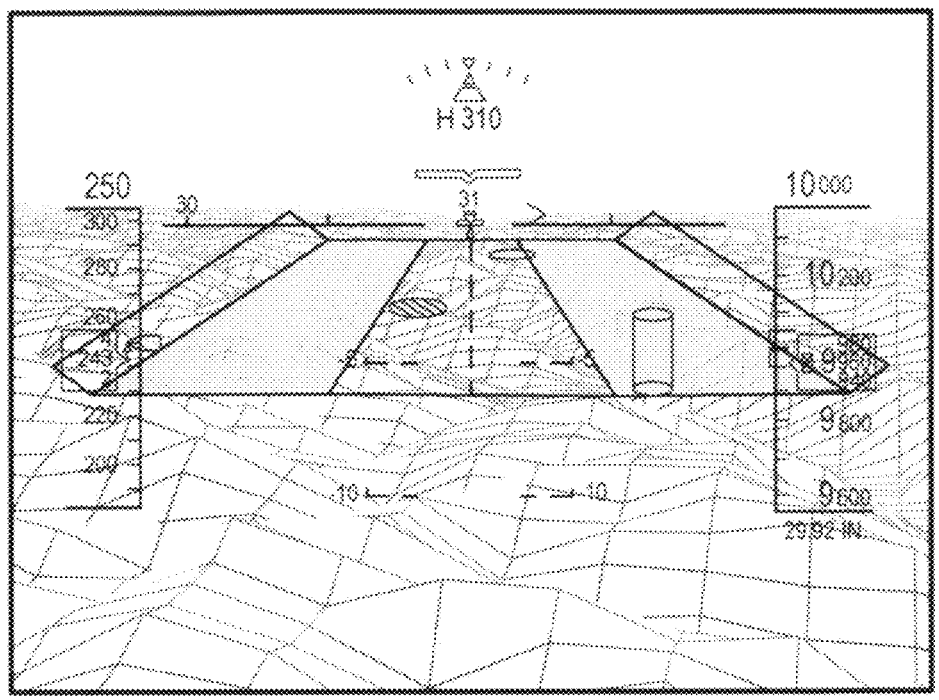
Figure 8D:
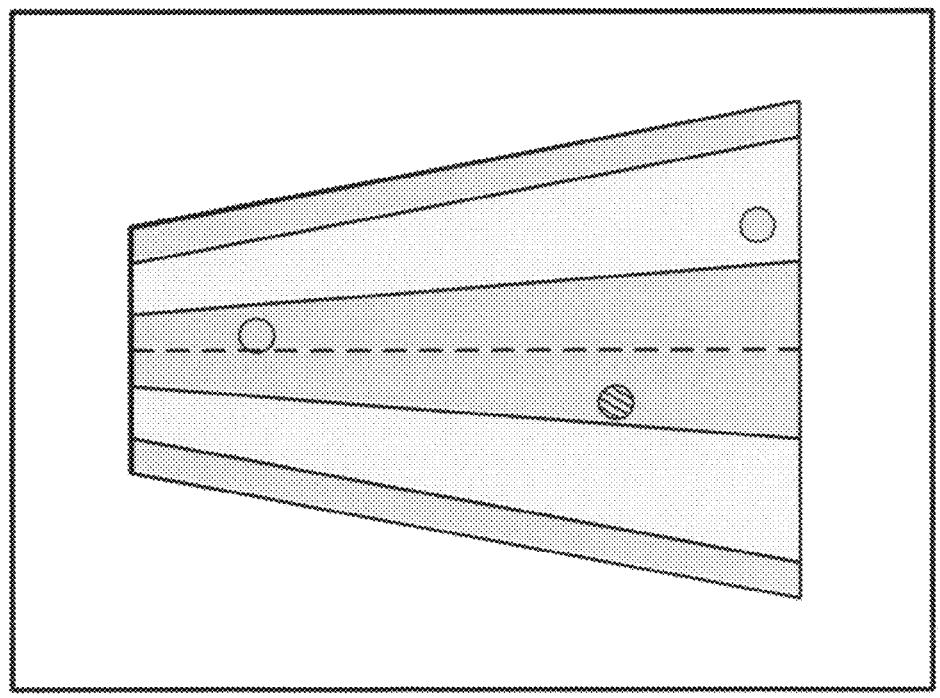
Figure 8E:
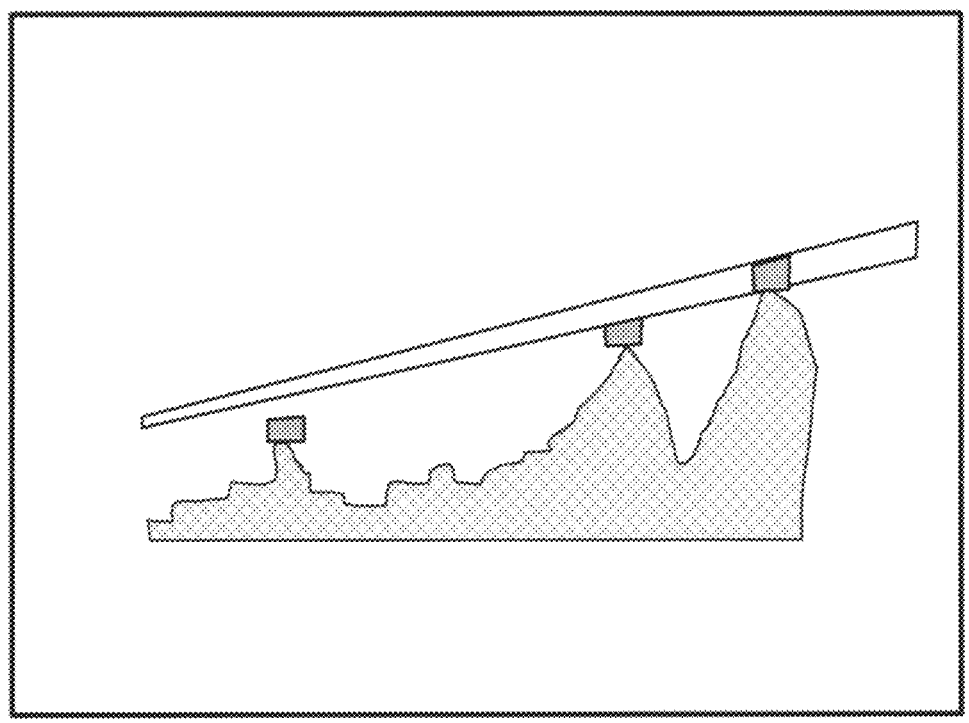

FIG. 8C provides an exemplary illustration of a flight route corridor and offending objects of FIG. 8B displayed on a tactical display unit 164. FIG. 8D provides an exemplary illustration of a flight route corridor and offending objects of FIG. 8B displayed on a display unit including, but not limited to, a strategic display unit 166 in a plan view. FIG. 8E provides another exemplary illustration of a flight route corridor and offending objects of FIG. 8B in a vertical situation view against a backdrop of the image of FIG. 7C that could be displayed on a display unit including, but not limited to, a strategic display unit 166.

Flight route corridor 320 and flight route 322 illustrate the use of straight lines to show the location of the flight route corridor. Offending object 324 illustrates one possible shape for depicting the location of a first type of offending object, i.e., one that could exceed a minimum obstacle clearance but does not penetrate the OCS. As illustrated, this type of offending object could be shown as a solid circle (ellipse in a three-dimensional depiction), where the solid could indicate that the floor of the corridor has not penetrated; this circle could be hollow allowing the background to be seen. Offending object 326 illustrates one possible shape for depicting the location of a second type of offending object, i.e., one that could penetrate an OCS but not a flight route corridor. As illustrated, this type of object could be shown as a solid circle (ellipse in a three-dimensional depiction) with hash marks to distinguish it from the first type of offending object. This circle could be hollow allowing the background to be seen. Offending object 328 illustrates one possible shape for depicting the location of a third type of offending object, i.e., one that could penetrate the flight route corridor. As illustrated, this type of object could be shown as a solid object or nearly solid that substantially blocks the background (e.g., terrain) indicating the presence of an object within the flight route corridor. In each of the preceding examples, the use of unique shapes provides the pilot with the ability to determine the location and type of each offending object displayed. Moreover, in each of the preceding examples, each object has been made conspicuous against the background and against the other highlighters.

The drawings of FIG. 8 provide examples of offending objects being depicted using various shapes. Offending objects may be further enhanced with the use of highlighters to enhance the location of a flight route corridor and each object of concern that may be displayed on a display unit. As shown in FIG. 8C, one possible highlighter for a flight route corridor is to depict the corridor as translucent, thereby allowing for the background of terrain to appear but not fully, providing a possible and slight blurring effect of the background (e.g., terrain) that could resemble frosted or smoked glass. Another possible highlighter is the use of shading; as shown in FIG. 8C, the part of the surface appearing between the 0.5 dots could be shaded to provide the pilot with a sense of location relative to the flight route. Also, the sides of a flight route corridor could be shaded to provide the pilot with a sense of height relative to the flight route where an aircraft appearing to operate "below" the sides could provide the pilot with the sense that the aircraft is operating below the flight route.

A plurality of location highlighters is available or configurable to a manufacturer or end-user. Those skilled in the art will appreciate the ability and ease with which executable software code may be reprogrammed or modified by a manufacturer or end-user to facilitate a configuration of highlighting symbology selected by a manufacturer or end-user without affecting or expanding the scope of the embodiments discussed herein. In the following paragraphs, other examples of criteria and performance factors are provided to illustrate the ability with which a manufacturer or end-user may define a maneuver profile as embodied herein. These illustrations are intended to provide examples of illuminating or highlighting symbology, and are not intended to provide a limitation or an exhaustive list of the embodiments discussed herein.

As noted above, the type of object could determine the selection of a highlighter. In one embodiment, an object can be depicted as a graphical image other than cylinders where such images which could provide the pilot or aircrew a symbolic association between the image and actual object. For example, a symbol or image of a transmission tower could be depicted in part or in whole if the offending object is a transmission tower, or a symbol or image of a mountain peak could be depicted where the offending object is a mountain peak. In another embodiment, a highlighter could be represented as two-dimensional or three-dimensional, and a highlighter could be open-ended or closed.

As mentioned above, an object highlighter could include not only the enhancing effects of translucency, hash marks, hollowness, and solids but also other including, but not limited to, shading, transparency, opacity, texture-mapping, bump-mapping, fogging, shadowing, patterns, colors, or any combination thereof. The utilization and employment of enhancing effects are known to those skilled in the art.

Another enhancing effect could be color. On a display unit capable of displaying colors, an object highlighter could be enhanced by color on a display where colors may be presented, and such color could depend on the height of the object in relation to the flight route corridor. For example, green could represent an object below an OCS; yellow or amber could represent an object that has penetrated an OCS but not the flight route corridor; and red could represent an object protruding into the corridor. In another example, an object highlighter could remain steady or flash intermittently, where such flashing could depend on the distance between the object and the aircraft, where such flashing could represent a specific range to the object. Each of these examples are intended to provide an example of enhancements which highlight the locations of objects, and are not intended to provide a limitation or an exhaustive list to the embodiments discussed herein.

FIG. 9 depicts a flowchart 400 of an example of a method for generating an aircraft flight route corridor. The flowchart begins with module 402 with the receiving of navigation data by a processor 150 including data representative of the aircraft position, attitude in flight, and flight route. The navigation data could be provided by a navigation system 110 to a processor 150, and position could comprise of geographic position (e.g., latitude and longitude coordinates) and altitude. As embodied herein, the receiving of data by a processor or the providing of data to a processor may include a step in which the processor performs a retrieval operation of such data. As embodied herein, a change in aircraft position could be used to determine the heading or direction of a scene outside the aircraft.

The flowchart continues with module 404 with the receiving of object data comprising of data representative of terrain and/or obstacles. Object data may be received from a terrain and/or obstacle data source 130. In one embodiment, terrain and/or obstacle data of a scene outside the aircraft could be provided by an object database. In another embodiment, a terrain and/or obstacle data could be provided by other aircraft systems or components thereof including, but not limited to, an SVS, an EVS, and a TAWS.

The flowchart continues to module 406 with the generation of an image data set by a processor 150 that could be programmed to determine the image data set as a function of navigation data, object data and flight route corridor data. A processor 150 could be programmed to determine flight route corridor data by applying navigation data and object data to flight route corridor design criteria. As embodied herein, the criteria that may be applied includes criteria corresponding to, but not limited to, a final approach route, a missed approach flight route, departure route, arrival route, or cruise route The flowchart continues to module 408 with the providing of an image data set to a display unit. Such image data set is representative of a three-dimensional perspective scene outside the aircraft, a flight route corridor, and/or any offending object, where the depiction of the either the flight route corridor or at least one offending object, or both, may be enhanced with highlighters. In one embodiment, a display unit could include, but is not limited to, a tactical unit display 164, strategic unit display 166, and/or HUD unit 168. In an additional embodiment, a display unit could present an image upon receipt of an image data set, whereby the location of a flight route corridor and each offending object appearing in a scene outside the aircraft is enhanced with a highlighter. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating an image of a flight route corridor on a display unit, such system comprising:

at least one source of navigation data;

a source of object data;

a processor configured to receive navigation data from at least one navigation data source;

receive object data corresponding to the navigation data from the object data source;

determine flight route corridor data by applying the navigation data and the object data to flight route corridor design criteria, where the flight route corridor data is representative of a flight route corridor comprised of a floor, a left side, and a right side, such that the floor is located beneath the flight route and is comprised of a left lateral boundary and a right lateral boundary, the left side originates from the left lateral boundary and extends upward either vertically or diagonally, and the right side originates from the right lateral boundary and extends upward either vertically or diagonally;

generate an image data set as a function of the navigation data, the object data, and the flight route corridor data, where the image data set is representative of an image depicting a three-dimensional perspective scene outside the aircraft, a three-dimensional perspective of the flight route corridor, and each offending object located beneath the flight route corridor, such that each offending object is depicted with a corresponding graphical image, and the physical appearance of each graphical image is dependent upon the height of its corresponding offending object in relation to the flight route corridor; and provide the image data set to a display unit; and the display unit configured to receive the image data set, and present the image represented in the image data set, whereby the three-dimensional perspective of the flight route corridor and each graphical image corresponding to one offending object located beneath the flight route corridor are presented against a background of the three-dimensional perspective scene outside the aircraft.

2. The system of claim 1, wherein the object data includes terrain data, obstacle data, or both.

3. The system of claim 1, wherein the processor is a processor of a synthetic vision system, an enhanced vision system, or a combined vision system.

4. The system of claim 1, wherein the flight route corridor design criteria comprises criteria corresponding to at least one of the following: a final approach route, a missed approach flight route, departure route, arrival route, or cruise route.

5. The system of claim 1, wherein at least one highlighter is used to enhance the presentation of the three-dimensional perspective of the flight route corridor, at least one offending object located beneath the flight route corridor, or both.

6. The system of claim 5, wherein each highlighter is configurable.

7. The system of claim 5, wherein the image data set is generated so that each highlighter contrasts with the background, does not blend with the presentation of flight information symbology, or both.

8. A module for generating an image of a flight route corridor on a display unit, such module comprising:

an input communications interface to facilitate a providing of data from at least one data source to a processor;

the processor configured to receive navigation data from at least one navigation data source;

receive object data corresponding to the navigation data from an object data source;

determine flight route corridor data by applying the navigation data and the object data to flight route corridor design criteria, where the flight route corridor data is representative of a flight route corridor comprised of a floor, a left side, and a right side, such that the floor is located beneath the flight route and is comprised of a left lateral boundary and a right lateral boundary, the left side originates from the left lateral boundary and extends upward either vertically or diagonally, and the right side originates from the right lateral boundary and extends upward either vertically or diagonally;

generate an image data set as a function of the navigation data, the object data, and the flight route corridor data, where the image data set is representative of an image depicting a three-dimensional perspective scene outside the aircraft, a three-dimensional perspective of the flight route corridor, and each offending object located beneath the flight route corridor, such that each offending object is depicted with a corresponding graphical image, and the physical appearance of each graphical image is dependent upon the height of its corresponding offending object in relation to the flight route corridor; and provide the image data set to an output communications interface; and the output communications interface to facilitate a providing of the image data set to a display unit.

9. The module of claim 8, wherein the processor is a processor of a synthetic vision system, an enhanced vision system, or a combined vision system.

10. The module of claim 8, wherein the flight route corridor design criteria comprises criteria corresponding to at least one of the following: a final approach route, a missed approach flight route, departure route, arrival route, or cruise route.

11. The module of claim 8, wherein at least one highlighter is used to enhance the presentation of the three-dimensional perspective of the flight route corridor, at least one offending object located beneath the flight route corridor, or both.

12. The module of claim 11, wherein each highlighter is configurable.

13. The module of claim 11, wherein the image data set is generated so that each highlighter contrasts with the background, does not blend with the presentation of flight information symbology, or both.

14. A method for generating an image of a flight route corridor on a display unit, such method comprising:

receiving navigation data from at least one navigation data source;

receiving object data corresponding to the navigation data from an object data source;

determining flight route corridor data by applying the navigation data and the object data to flight route corridor design criteria, where the flight route corridor data is representative of a flight route corridor comprised of a floor, a left side, and a right side, such that the floor is located beneath the flight route and is comprised of a left lateral boundary and a right lateral boundary, the left side originates from the left lateral boundary and extends upward either vertically or diagonally, and the right side originates from the right lateral boundary and extends upward either vertically or diagonally;

generating an image data set as a function of the navigation data, the object data, and the flight route corridor data, where the image data set is representative of an image depicting a three-dimensional perspective scene outside the aircraft, a three-dimensional perspective of the flight route corridor, and each offending object located beneath the flight route corridor, such that each offending object is depicted with a corresponding graphical image, and the physical appearance of each graphical image is dependent upon the height of its corresponding offending object in relation to the flight route corridor; and providing the image data set to a display unit for the presentation of the image represented in the image data set, whereby the three-dimensional perspective of the flight route corridor and each graphical image corresponding to one offending object located beneath the flight route corridor are presented against a background of the three-dimensional perspective scene outside the aircraft.

15. The method of claim 14, wherein the object data includes terrain data, obstacle data, or both.

16. The method of claim 14, wherein the flight route corridor design criteria comprises criteria corresponding to at least one of the following: a final approach route, a missed approach flight route, departure route, arrival route, or cruise route.

17. The method of claim 14, wherein at least one highlighter is used to enhance the presentation of the three-dimensional perspective of the flight route corridor, at least one offending object located beneath the flight route corridor, or both.

18. The method of claim 17, wherein each highlighter is configurable.

19. The method of claim 17, wherein the image data set is generated so that each highlighter contrasts with the background, does not blend with the presentation of flight information symbology, or both.

\* \* \* \* \*